Patented Apr. 15, 1952

2,593,156

UNITED STATES PATENT OFFICE 2,593,156

ETHYLENE OXIDATION AND SILVER ON MAGNETITE AS CATALYST THEREFOR

Frances W. Lamb, Detroit, Mich., assignor to Ethyl Corporation, New York, N. Y., a corporation of Delaware No Drawing. Application December 9, 1950, Serial No. 200,125

4 Claims. (Cl. 260—348.5)

This invention relates to a support for a catalyst useful in the oxidation of olefins. In particular our invention relates to a catalyst support for the oxidation of ethylene to ethylene oxide. Our invention is also directed to a process for the oxidation of ethylene using silver deposited on such support.

Ethylene oxide is an important chemical intermediate, being employed commercially in many processes. For example, acrylonitrile can be manufactured by treating ethylene oxide with hydrogen cyanide. Hydrolysis of ethylene oxide to ethylene glycol results in an important antifreeze compound. Likewise, from ethylene glycol can be prepared dinitro glycol for dynamite. Furthermore, ethanolamines, resins, polymers, aldehydes and glycol ethers can be manufactured from ethylene oxide. By treating the oxide with alkyl phenols important detergents can be manufactured, etc. Finally ethylene oxide finds commercial use itself as a solvent and fumigant.

It is well known that silver catalyzes the oxidation of ethylene, by means of air or oxygen, to ethylene oxide. Of the many catalysts proposed for this reaction, only silver has been proved in practice to possess sufficient activity and selectivity to merit consideration in a commercial operation. However, for successful commercial operation such catalyst must remain active over long periods of use, must be insensitive to changes of temperature, and must be relatively insensitive to impurities present in the reactants. Silver metal, used alone fails to satisfy these requirements. In addition, the conversion of ethylene to ethylene oxide must be high and the formation of by-products, or products of competing reactions must be minimized in order that the manufacturing process be economically attractive. Silver alone produces extremely small yields of ethylene oxide and uneconomically high yields of acetaldehyde, carbon dioxide and water.

Various means have been proposed to overcome these disadvantages, such as incorporating an inert material with the silver, with limited success. Most of these expedients produce a catalyst which suffers from one or more of the disadvantages inherent in the silver alone. In addition, control of the reaction, because of poor heat transfer of the supported catalyst makes the reaction temperature more difficult to control, resulting in an increased proportion of undesirable products, or requiring complicated reactors with internal cooling facilities. To be commercially acceptable it is preferred that a catalyst be supported on a material which can be utilized in a fluidized condition. Many supports which can be utilized in a thermally inefficient fixed-bed reactor cannot be satisfactorily fluidized, and agglomerate, channel, or "slug" when fluidized operation is attempted. Furthermore, a catalyst for the oxidation must attain its maximum activity within a reasonable period of operation.

It is, accordingly, an object of this invention to provide a support material for silver such that ethylene oxide can be produced by the direct oxidation of ethylene in its presence and an improved yield obtained thereby. An additional object is to provide a supported silver catalyst which retains maximum activity over long periods, to produce a high yield of ethylene oxide over a broad range of temperatures, and is not destroyed by accidental exposure to abnormally high temperature. It is a further object of this invention to provide a catalyst support for the manufacture of ethylene oxide whereby the activity of the catalyst reaches a maximum after a short period of operation. As a still further object a means is provided for preparing a supported silver catalyst which can be utilized in a process employing fluidized technique to obtain proper control of the exothermic reaction, and minimize the side and secondary reactions. Other objects of our invention will appear from the further description hereinafter.

I obtain the advantages of my invention by incorporating silver on a support consisting of $Fe_3O_4$, commonly referred to as magnetite. The conventional amount of silver is deposited on my support, namely 4 to 50 per cent with the best results being obtained between 4 and 20 per cent.

The temperature of reaction for the process of this invention is between 150° and 400° C. although the normal preferred range is between 250° and 300° C. An important advantage of the support of this invention is that it stands up well at temperatures above 300° C. Frequently due to poisoning, the silver catalyst loses its activity but the activity can be restored when the temperature is increased above 300° C. Also misoperation may result in a high temperature which must be withstood by the support. The supports of the prior art are deficient in this respect.

It is also important that the catalytic activity of the support reach a maximum after a short period of operation, in order to increase its usefulness. The support of this invention is excellent in this respect.

The reaction between ethylene and oxygen proceeds at either atmospheric, subatmospheric or superatmospheric pressures. The proportion of ethylene and oxygen or air (or other oxygen-containing gas) while not critical should preferably be between 1:5 and 1:20 parts of ethylene to air.

The silver catalyst on the support used in carrying out the reaction can be disposed in the reaction vessel in any manner provided the necessary contact time is provided, which is preferably between 5 and 30 minutes. However, one advantage of the catalyst support of this invention is that it is readily adaptable to fluidized technique because it can be readily fluidized. Many supports are difficult and even impossible to fluidize.

In order to best fluidize my catalyst and support the catalyst particle size is important. The particles should not be all the same size and it is important that a certain percentage should be small in order to provide a lubricating effect. For best results in a fluid operation the particle size mixture should have 20 to 40 parts between 100- and 200-mesh, 20 to 40 parts between 200–325 mesh, and 30 to 50 parts smaller than 325-mesh.

It is customary in this art to use promoters in order to increase the activity of the silver. While good results are obtained in my process without a promoter, for best results one of the following promoters should be used: $BaO_2$, $CaO_2$, $BaCO_3$, benzoyl peroxides and generally the oxides, hydroxides, carbonates, and peroxides of the alkali and alkaline earth metals. However, I prefer to use barium peroxide, $BaO_2$ as the promoter.

The support and catalyst may be prepared and used in any suitable manner as that generally described in the article by McBee, Haas, and Wiseman, Industrial and Engineering Chemistry, 37, 432 (1945). However, since it is preferred to use the catalyst in a fluidized operation the procedure best suited for such operation will be described. However, my invention is not limited to a fluidized operation.

The support material to be tested is first mixed in the proper proportion and then sized by screening with standard screens of 100-, 200-, and 325-mesh. The different particle sizes falling within the above mesh sizes are then mixed with silver oxide and distilled water thereby forming a slurry. The promoter is also added at this point. The slurry is heated while agitating to a temperature of about 120° C. until the catalyst is thoroughly dried. After such drying, each size of catalyst is rescreened and the desired portions of each size are mixed and the catalyst is ready for use in the fluidized reactor.

The invention can be best understood by referring to the following working examples.

A commercial grade $Fe_3O_4$, commonly referred to as magnetite and having the crystal structure of a spinel was crushed, ground and incorporated with silver as described above. Also 2.0 per cent of barium peroxide as a promoter was added.

After drying the silver content was 17.3 per cent and the mixture contained 32 parts between 100- and 200-mesh, 23 parts between 200- and 325-mesh, and 45 parts smaller than 325-mesh. To a reactor suitable for fluidized operation and containing 100 parts of catalyst were introduced continuously 10 parts of air to 1 part of ethylene. The reaction temperature was maintained at 234° C. and the pressure was atmospheric. The reaction products were continuously separated from the catalyst. The catalyst reached its maximum activity quickly and after 469.5 hours, the conversion to ethylene oxide was 32.6 per cent with 72.7 per cent of the ethylene reacting.

Within the limits heretofore set forth variations in particle size and temperature resulting in conversions to ethylene oxide between 25 and 35 per cent.

Having described and illustrated my invention, other embodiments within the scope of the following claims are readily apparent to one skilled in the art.

1. An oxidation catalyst consisting essentially of silver and a support for said silver consisting essentially of $Fe_3O_4$ having the crystal structure of a spinel and having deposited thereon 4 to 20 per cent of silver oxide.

2. A process for making ethylene oxide comprising reacting ethylene with oxygen in the presence of silver oxidation catalyst supported by $Fe_3O_4$.

3. The catalyst of claim 1 in which the particle size distribution is as follows: 20 to 40 parts between 100- and 200-mesh, 20 to 40 parts between 200- and 325-mesh, and 30 to 50 parts smaller than 325-mesh.

4. A fluidized process for making ethylene oxide comprising reacting ethylene with air in the presence of the catalyst of claim 3 under a temperature between 150 and 400° C. and for a time between 5 and 30 minutes.

FRANCES W. LAMB.

REFERENCES CITED

The following references are of record in the file of this patent:

UNITED STATES PATENTS

| Number | Name | Date |
|---|---|---|
| 1,998,878 | Lefort | Apr. 23, 1935 |
| 2,407,066 | Dunlap | Sept. 3, 1946 |